United States Patent [19]

Krašovec et al.

[11] 4,113,884

[45] Sep. 12, 1978

[54] PROCESS FOR THE PREPARATION OF A CONCENTRATE FROM WASTE CHICKEN-BROTH AND PRODUCT THEREFROM

[75] Inventors: Branko Krašovec; Eli Mihelič; Suzana Reutlinger, all of Ljubljana, Yugoslavia

[73] Assignee: HP Kolinska Ljubljana Prehrambena Industrija (n.sol.o.), Ljubljana, Yugoslavia

[21] Appl. No.: 778,319

[22] Filed: Mar. 16, 1977

[30] Foreign Application Priority Data

Nov. 25, 1976 [YU] Yugoslavia .......................... 2883/76

[51] Int. Cl.² ...................... A23L 1/313; A23L 1/315; A23L 1/40

[52] U.S. Cl. ..................................... 426/56; 426/589; 426/648

[58] Field of Search .................. 426/56, 63, 589, 644, 426/329, 417, 644, 574, 652, 437, 480, 648, 650, 651

[56] References Cited

U.S. PATENT DOCUMENTS 3,891,770   6/1975   Sato et al. .............................. 426/63

*Primary Examiner*—Jeanette M. Hunter
*Attorney, Agent, or Firm*—Michael J. Striker

[57] ABSTRACT

A process for preparing a concentrate from waste chicken broth by heating, adding an antigelling enzyme, stirring for 20-60 minutes, adding an anti-foaming agent, boiling the mixture to separate fats and dry solids, removing insoluble residues and fats and concentrating the broth.

3 Claims, No Drawings

PROCESS FOR THE PREPARATION OF A CONCENTRATE FROM WASTE CHICKEN-BROTH AND PRODUCT THEREFROM

The present invention relates to the treatment of waste chicken-broth resulting from the production of dehydrated chicken meat to derive therefrom a concentrate suitable for incorporation into food products.

It is known from the poultry processing industry to produce meat concentrates. The known methods of this type are normally performed in the following way.

Drawn, deeply frozen, at least 1 year old chickens are defrosted, halved, freed from residual impurities and boiled in a pressure vessel at 1.5 to 2 gauge pressure. The well-cooked chickens are separated from the broth and grease, boned and minced. The mince is dried, either in vacuum or by means of hot air, packaged and stored. The obtained product serves as an ingredient of various soup concentrates.

The main disadvantage of the prior art processes resides in the poor utilization of the broth resulting as a by-product in large quantities. The present disposal of this by-product is devoted to its concentration, which, however, is limited to max. 40% of the dry substance owing to the jelly-like consistency of the broth as well as its excessive foaming during the concentration step, which reduces the evaporator capacity. The poor utilization of the broth is a serious economical draw-back and gives rise to waste water and environment pollution problems respectively.

The present invention is based on the realization that by adopting an enzymatic treatment of the broth by papain it will be possible to avoid the above said drawbacks. This has been accomplished by the novel inventive process according to which waste chicken-broth resulting from the production of dehydrated chicken meat is heated to a temperature of 50° to 55° C., followed by the addition of an aqueous suspension of papain, corresponding to 0.4 to 0.8% by weight of the enzyme with reference to the dry substance of the broth stirred for 20 to 60 minutes at this temperature, admixed with max. 1% by weight of an antifoaming agent and kept boiling for approximately 10 minutes, freed from the insoluble residue and evaporated.

The enzymatic treatment of waste chicken-broth by papain has not been known or used by others and represents the essential novel feature of this invention. While not wishing to be bound by any particular theory it is believed that the treatment by papain results in the breaking up of the peptidic bonds of those protein components of the broth which cause the gelling and the undesirable gumlike consistency of the concentrate. The process may be performed selectively, yielding a desired composition of amino acids without impairing the creatinine content. Furtheron, the excessive foaming is minimized and the evaporation yields a broth concentrate comprising max. 85% of the dry substance. Compared with the prior art methods the improvement is virtually 100% by weight.

The inventive process involves the use of a powdered Food Grade papain with an enzymatic activity of approximately 30,000 IE/gr., assessed e.g. by the following references:

M. L. Anson, J. Gen. Physiol. 22, 79 (1939)
H. U. Bergmeyer, Methoden der enzymatischen Analyse, First Ed., p. 807
Willstadter und Grassmann, Zeitschrift fur physiologische Chemie 138, 184 (1924)
Euler, Chemie der Enzyme Vol. II/2, page 444 and 544 (1927).

After the enzymatic treatment the broth is easily freed from the residue, consisting of insoluble grease and fibrous scleroproteines.

The evaporation of the purified broth may be performed by any suitable means, either in a batch or continuous way, using, however, an equipment of stainless steel.

The final concentrate is clearer and purer in comparison with prior art concentrates and possesses therefore an improved stability. Owing to the diminished volume the storage costs are reduced.

The concentrate of the invention is useful as an essential nutritional ingredient of food materials, preferably soups, gravies and the like.

The invention will be illustrated by the following specific best mode Example, but it is to be understood that its scope is not considered as limited thereby.

EXAMPLE

As raw material there were used at least 1 year old chickens, reared on farms and weighing from 1.5 to 3 kgs, which were previously drawn and stored at a temperature of −18° to −20° C. They were defrosted in a classical way or by means of the microwave technique. Subsequently, they were halved, freed from the residual impurities and controlled.

A batch of 300 kgs of chickens was treated in baskets by vapour in a vertical pressure vessel at 1.5 to 2 gauge pressure until they were well cooked. The dwell time depends on the toughness and the size of the chickens. Another batch of chickens was boiled in the same extract, yielding a concentration of 9 to 10% of the dry substance. The broth was pumped into the storage tank and allowed to stand. After an hour the separated grease was decanted.

The broth was cooled in a refrigerator to the temperature of 15° C. to inhibit the growth of bacteria. The maximum storage time was 48 hours at a temperature of 2 to 5° C.

Thereafter the enzymatic treatment was performed batchwise on 250 l. of the broth obtained by boiling 940 kgs of chickens.

The broth was heated in a duplicator, equipped with a stirrer, to a temperature of 50° to 55° C. and admixed to an aqueous suspension of Food Grade papain, corresponding to 0.6% of the enzyme with reference to the dry substance in the broth and stirred for 30 minutes. There was added 1% of an antifoaming agent, preferably a product with a trademark LAS 3, produced by HEFTI, Switzerland, with reference to the dry substance of the broth and kept boiling for approximately 10 minutes.

The mixture was pumped sublevelly from the duplicator into a separator, wherein the separation was performed approximately within 15 minutes. The broth was fed from the separator into a batch type concentrator, in a quatity of 2000 kgs, which required 25 boiling procedures in the pressure vessel as well as 8 enzymatic treatments, which corresponds to 7500 kgs of chickens.

The concentrator-evaporator consisted of a boiler which was indirectly heated by vapour and equipped with a stirrer and a vacuum condensation pump. The concentration step was preformed in 12 hours — the feeding-in and -out included — and yielded 250 kgs of the concentrate comprising 80% of the dry substance.

From 1000 kgs of chickens there were thus obtained 42 kgs of the concentrate comprising 80% of the dry substance, and 60 kgs of pure grease.

What we claim is:

1. A process of preparing a nutritional concentrate from waste chicken broth which contains dry solids as well as insoluble residues and fats, comprising the steps of heating the broth to a temperature of substantially 50°–55° C.; adding to the heated broth an acqueous suspension of anti-gelling enzyme within the range of substantially 0.4 to 0.9% by weight of the dry broth solids; stirring the broth and enzyme for substantially 20–60 minutes while at said temperature; adding an anti-foaming agent in an amount up to 1% by weight of the dry broth solids; boiling the broth with the therein admixed enzyme and anti-foaming agent for approximately 10 minutes to segregate the insoluble residues and fats from the dry solids; removing the segregated insoluble residues and fats; and concentrating the remainder of the broth.

2. A process as defined in claim 1, wherein the anti-gelling enzyme is food-grade papain having an enzymatic activity of approximately 30,000 IE/gram.

3. A nutritional concentrate obtained by the process of claim 1.

* * * * *